US006576895B1

(12) United States Patent
Park

(10) Patent No.: US 6,576,895 B1
(45) Date of Patent: *Jun. 10, 2003

(54) COAXIAL MULTIPLE REFLECTION TIME-OF-FLIGHT MASS SPECTROMETER

(75) Inventor: Melvin Park, Nashua, NH (US)

(73) Assignee: Bruker Daltonics Inc., Billerica, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/614,526

(22) Filed: Jul. 12, 2000

Related U.S. Application Data

(63) Continuation of application No. 08/866,134, filed on May 30, 1997, now Pat. No. 6,107,625.

(51) Int. Cl.[7] .......................... B01D 59/44; H01J 49/00

(52) U.S. Cl. ....................................... 250/287; 250/288

(58) Field of Search ................................. 250/287, 288

(56) References Cited

U.S. PATENT DOCUMENTS 4,072,862 A * 2/1978 Mamyrin et al. ........... 250/287
4,164,754 A * 8/1979 Dubois
4,625,112 A * 11/1986 Yoshida ...................... 250/287
5,144,127 A * 9/1992 Williams et al. ............ 250/282
5,226,136 A * 7/1993 Nakagawa
5,572,035 A * 11/1996 Franzen .................. 250/396 R
5,641,959 A * 6/1997 Holle et al. ................. 250/287
5,654,545 A * 8/1997 Holle et al. ................. 250/282
5,739,529 A * 4/1998 Laukien et al. ............. 250/287

* cited by examiner

*Primary Examiner*—Bruce Anderson
(74) *Attorney, Agent, or Firm*—Ward & Olivo

(57) ABSTRACT

The present invention relates generally to time-of-flight mass spectrometers and discloses an improved method and apparatus for analyzing ions using a time-of-flight mass spectrometer. More specifically, the present invention comprises two or more electrostatic reflectors positioned coaxially with respect to one another such that ions generated by an ion source can be reflected back and forth between them. The first reflecting device is an ion accelerator which functions as both an accelerating device to provide the initial acceleration to the ions, and a reflecting device to reflect the ions in the subsequent mass analysis. The second reflecting device is a reflectron which functions only to reflect the ions in the mass analysis. During the mass analysis, the ions are reflected back and forth between the accelerator and reflectron multiple times. Then, at the end of the ion analysis, either of the reflecting devices, preferably the ion accelerator, is rapidly deenergized to allow the ions to pass through that reflecting device and into a detector. By reflecting the ions back and forth between the accelerator and reflectror several times, a much longer flight path can be achieved in a given size spectrometer than could otherwise be achieved using the time-of-flight mass spectrometers disclosed in the prior art. Consequently, the mass resolving power of the time-of-flight mass spectrometer of the present invention is substantially greater than that of the prior art.

38 Claims, 11 Drawing Sheets

COAXIAL MULTIPLE REFLECTION TIME-OF-FLIGHT MASS SPECTROMETER

This is a continuation of Ser. No. 08/866,134, filed May 30, 1997, now U.S. Pat. No. 6,107,625.

TECHNICAL FIELD OF THE INVENTION

The present invention relates generally to the mass spectroscopic analysis of chemical samples and more particularly to time-of-flight mass spectrometry. More specifically, a means and method are described for the analysis of ionized species in a spectrometer containing two or more reflecting device such that ions can be reflected back and forth between these devices, thereby extending the flight time of the ions without extending the length of the flight tube.

BACKGROUND OF THE INVENTION

The present invention relates generally to ion beam handling and more particularly to ion deflection and ion selection in time-of-flight mass spectrometers (TOFMS). The apparatus and method of mass analysis described herein is an enhancement of the techniques that are referred to in the literature relating to mass spectrometry.

The analysis of ions by mass spectrometers is important, as mass spectrometers are instruments that are used to determine the chemical structures of molecules. In these instruments, molecules become positively or negatively charged in an ionization source and the masses of the resultant ions are determined in vacuum by a mass analyzer that measures their mass/charge (m/z) ratio. Mass analyzers come in a variety of types, including magnetic field (B), combined (double-focusing) electrical (E) and magnetic field (B), quadrupole (Q), ion cyclotron resonance (ICR), quadrupole ion storage trap, and time-of-flight (TOF) mass analyzers, which are of particular importance with respect to the invention disclosed herein. Each mass spectrometric method has a unique set of attributes. Thus, TOFMS is one mass spectrometric method that arose out of the evolution of the larger field of mass spectrometry.

The analysis of ions by TOFMS is, as the name suggests, based on the measurement of the flight times of ions from an initial position to a final position. Ions which have the same initial kinetic energy but different masses will separate when allowed to drift through a field free region.

Ions are conventionally extracted from an ion source in small packets. The ions acquire different velocities according to the mass-to-charge ratio of the ions. Lighter ions will arrive at a detector prior to high mass ions. Determining the time-of-flight of the ions across a propagation path permits the determination of the masses of different ions. The propagation path may be circular or helical, as in cyclotron resonance spectrometry, but typically linear propagation paths are used for TOFMS applications.

TOFMS is used to form a mass spectrum for ions contained in a sample of interest. Conventionally, the sample is divided into packets of ions that are launched along the propagation path using a pulse-and-wait approach. In releasing packets, one concern is that the lighter and faster ions of a trailing packet will pass the heavier and slower ions of a preceding packet. Using the traditional pulse-and-wait approach, the release of an ion packet as timed to ensure that the ions of a preceding packet reach the detector before any overlap can occur. Thus, the periods between packets is relatively long. If ions are being generated continuously, only a small percentage of the ions undergo detection. A significant amount of sample material is thereby wasted. The loss in efficiency and sensitivity can be reduced by storing ions that are generated between the launching of individual packets, but the storage approach carries some disadvantages.

Resolution is an important consideration in the design and operation of a mass spectrometer for ion analysis. The traditional pulse-and-wait approach in releasing packets of ions enables resolution of ions of different masses by separating the ions into discernible groups. However, other factors are also involved in determining the resolution of a mass spectrometry system. "Space resolution" is the ability of the system to resolve ions of different masses despite an initial spatial position distribution within an ion source from which the packets are extracted. Differences in starting position will affect the time required for traversing a propagation path. "Energy resolution" is the ability of the system to resolve ions of different mass despite an initial velocity distribution. Different starting velocities will affect the time required for traversing the propagation path.

In addition, two or more mass analyzers may be combined in a single instrument to form a tandem mass spectrometer (MS/MS, MS/MS/MS, etc.). The most common MS/MS instruments are four sector instruments (EBEB or BEEB), triple quadrupoles (QQQ), and hybrid instruments (EBQQ or BEQQ). The mass/charge ratio measured for a molecular ion is used to determine the molecular weight of a compound. In addition, molecular ions may dissociate at specific chemical bonds to form fragment ions. Mass/charge ratios of these fragment ions are used to elucidate the chemical structure of the molecule. Tandem mass spectrometers have a particular advantage for structural analysis in that the first mass analyzer (MS1) can be used to measure and select molecular ion from a mixture of molecules, while the second mass analyzer (MS2) can be used to record the structural fragments. In tandem instruments, a means is provided to induce fragmentation in the region between the two mass analyzers. The most common method employs a collision chamber filled with an inert gas, and is known as collision induced dissociation CID. Such collisions can be carried out at high (5–10 keV) or low (10–100 eV) kinetic energies, or may involve specific chemical (ion-molecule) reactions. Fragmentation may also be induced using laser beams (photodissociation), electron beams (electron induced dissociation), or through collisions with surfaces (surface induced dissociation). It is possible to perform such an analysis using a variety of types of mass analyzers including TOF mass analysis.

In a TOFMS instrument, molecular and fragment ions formed in the source are accelerated to a kinetic energy:

$$eV = \frac{1}{2}mv^2 \tag{1}$$

where e is the elemental charge, V is the potential across the source/accelerating region, m is the ion mass, and v is the ion velocity. These ions pass through a field-free drift region of length L with velocities given by equation 1. The time required for a particular ion to traverse the drift region is directly proportional to the square root of the mass/charge ratio:

$$t = L\sqrt{\frac{m}{2eV}} \tag{2}$$

Conversely, the mass/charge ratios of ions can be determined from their flight times according to the equation:

$$\frac{m}{e} = at^2 + b \quad (3)$$

where a and b are constants which can be determined experimentally from the flight times of two or more ions of known mass/charge ratios.

Generally, TOF mass spectrometers have limited mass resolution. This arises because there may be uncertainties in the time that the ions were formed (time distribution), in their location in the accelerating field at the time they were formed (spatial distribution), and in their initial kinetic energy distributions prior to acceleration (energy distribution).

The first commercially successful TOFMS was based on an instrument described by Wiley and McLaren in 1955 (Wiley, W. C.; McLaren, I. H., Rev. Sci. Instrumen. 26 1150 (1955)). That instrument utilized electron impact (EI) ionization (which is limited to volatile samples) and a method for spatial and energy focusing known as time-lag focusing. In brief, molecules are first ionized by a pulsed (1–5 microsecond) electron beam. Spatial focusing was accomplished using multiple-stage acceleration of the ions. In the first stage, a low voltage (−150 V) drawout pulse is applied to the source region that compensates for ions formed at different locations, while the second (and other) stages complete the acceleration of the ions to their final kinetic energy (−3 keV ). A short time-delay (1–7 microseconds) between the ionization and drawout pulses compensates for different initial kinetic energies of the ions, and is designed to improve mass resolution. Because this method required a very fast (40 ns) rise time pulse in the source region, it was convenient to place the ion source at ground potential, while the drift region floats at −3 kV. The instrument was commercialized by Bendix Corporation as the model NA-2, and later by CVC Products (Rochester, N.Y.) as the model CVC-2000 mass spectrometer. The instrument has a practical mass range of 400 daltons and a mass resolution of 1/300, and is still commercially available.

There have been a number of variations on this instrument. Muga (TOFTEC, Gainsville) has described a velocity compaction technique for improving the mass resolution (Muga velocity compaction). Chatfield et al. (Chatfield FT-TOF) described a method for frequency modulation of gates placed at either end of the flight tube, and Fourier transformation to the time domain to obtain mass spectra. This method was designed to improve the duty cycle.

Cotter et al. (VanBreeman, R. B.: Snow, M.: Cotter, R. J., Int. J. Mass Spectrom. Ion Phys. 49 (1983) 35.; Tabet, J. C.; Cotter, R. J., Anal. Chem. 56 (1984) 1662; Olthoff, J. K.; Lys, I.: Demirev, P.: Cotter, R. J., Anal. Instrumen. 16 (1987) 93, modified a CVC 2000 time-of-flight mass spectrometer for infrared laser desorption of involatile biomolecules, using a Tachisto (Needham, Mass.) model 215G pulsed carbon dioxide laser. This group also constructed a pulsed liquid secondary time-of-flight mass spectrometer (liquid SIMS-TOF) utilizing a pulsed (1–5 microsecond) beam of 5 keV cesium ions, a liquid sample matrix, a symmetric push/pull arrangement for pulsed ion extraction (Olthoff, J. K.; Cotter, R. J., Anal. Chem. 59 (1987) 999–1002.; Olthoff, J. K.; Cotter, R. J., Nucl. Instrum. Meth. Phys. Res. B-26 (1987) 566–570. In both of these instruments, the time delay range between ion formation and extraction was extended to 5–50 microseconds, and was used to permit metastable fragmentation of large molecules prior to extraction from the source. This in turn reveals more structural information in the mass spectra.

The plasma desorption technique introduced by Macfarlane arid Torgerson in 1974 (Macfarlane, R. D.; Skowronski, R. P.; Torgerson, D. F., Biochem. Biophys. Res Commoun. 60 (1974) 616.) formed ions on a planar surface placed at a voltage of 20 kV. Since there are no spatial uncertainties, ions are accelerated promptly to their final kinetic energies toward a parallel, grounded extraction grid, and then travel through a grounded drift region. High voltages are used, since mass resolution is proportional to U o/;eV, where the initial kinetic energy, U 0/is of the order of a few electron volts. Plasma desorption mass spectrometers have been constructed at Rockefeller (Chait, B. T.; Field, F. H., J. Amer. Chem. Soc. 106 (1984) 193), Orsay (LeBeyec, Y.; Della Negra, S.; Deprun, C.; Vigny, P.; Giont, Y. M., Rev. Phys. Appl 15 (1980) 1631), Paris (Viari, A.; Ballini, J. P.; Vigny, P.; Shire, D.; Dousset, P., Biomed. Environ. Mass Spectrom, 14 (1987) 83), Upsalla (Hakansson, P.; Sundqvist B., Radiat. Eff. 61 (1982) 179) and Darmstadt (Becker, O.; Furstenau, N.; Krueger, F. R.; Weiss, G.; Wein, K., Nucl. Instrum. Methods 139 (1976) 195). A plasma desorption time-of-flight mass spectrometer has bee commercialized by BIO-ION Nordic (Upsalla, Sweden). Plasma desorption utilizes primary ion particles with kinetic energies in the MeV range to induce desorption/ionization. A similar instrument was constructed at Manitobe (Chain, B. T.; Standing, K. G., Int. J. Mass Spectrum. Ion Phys. 40 (1981) 185) using primary ions in the keV range, but has not been commercialized.

Matrix-assisted laser desorption, introduced by Tanaka et al. (Tanaka, K.; Waki, H.; Ido, Y.; Akita, S.; Yoshida, Y.; Yoshida, T., Rapid Commun. Mass Spectrom. 2 (1988) 151) and by Karas and Hillenkamp (Karas, M.; Hillenkamp, F., Anal. Chem. 60 (1988) 2299) utilizes TOFMS to measure the molecular weights of proteins in excess of 100,000 daltons. An instrument constructed at Rockefeller (Beavis, R. C.; Chait, B. T., Rapid Commun. Mass Spectrom. 3 (1989) 233) has been commercialized by VESTEC (Houston, Tex.), and employs prompt two-stage extraction of ions to an energy of 30 keV.

Time-of-flight instruments with a constant extraction field have also been utilized with multi-photon ionization, using short pulse lasers.

The instruments described thus far are linear time-of-flights, that is: there is no additional focusing after the ions are accelerated and allowed to enter the drift region. Two approaches to additional energy focusing nave been utilized: those which pass the ion beam through an electrostatic energy filter.

The reflectron (or ion mirror) was first described by Mamyrin (Mamyrin, B. A.; Karatajev. V. J.; Shmikk, D. V.; Zagulin, V. A., Sov. Phys., JETP 37 (1973) 45). At the end of the drift region, ions enter a retarding field from which they are reflected back through the drift region at a slight angle. Improved mass resolution results from the fact that ions with larger kinetic energies must penetrate the reflecting field more deeply before being turned around. These faster ions than catch up with the slower ions at the detector and are focused. Reflectrons were used on the laser microprobe instrument introduced by Hillenkamp et al. (Hillenkamp, F.; Kaufmann, R.; Nitsche, R.; Unsold, E., Appl. Phys. 8 (1975) 341) and commercialized by Leybold Hereaus as the LAMMA (LAser Microprobe Mass Analyzer). A similar instrument was also commercialized by Cambridge Instruments as the IA (Laser Ionization Mass Analyzer). Benninghoven (Benninghoven reflectron) has described a SIMS (secondary ion mass spectrometer) instrument that also utilizes a reflectron, and is currently being commercialized by Leybold Hereaus. A reflecting SIMS instrument has also been constructed by Standing (Standing, K. G.; Beavis, R.; Bollbach, G.; Ens, W.; Lafortune, F.; Main, D.; Schueler, B.; Tang, X.; Westmore, J. B., Anal. Instrumen. 16 (1987) 173).

Lebeyec (Della-Negra, S.; Lebeyec, Y., in Ion Formation from Organic Solids IFOS III, ed. by A. Benninghoven, pp 42–45, Springer-Verlag, Berlin (1986)) described a coaxial reflectron time-of-flight that reflects ions along the same path in the drift tube as the incoming ions, and records their arrival times on a channel-plate detector with a centered hole that allows passage of the initial (unreflected) beam. This geometry was also utilized by Tanaka et al. (Tanaka, K.; Waki, H.; Ido, Y.; Akita, S.; Yoshida, T., Rapid Commun. Mass Spectrom. 2 (1988) 151) for matrix assisted laser desorption. Schlag et al. (Grotemeyer, J.; Schlag, E. W., Org. Mass Spectrom. 22 (1987) 758) have used a reflectron on a two-laser instrument. The first laser is used to ablate solid samples, while the second laser forms ions by multi-photon ionization. This instrument is currently available from Bruker. Wollnik et al. (Grix., R., Kutscher, R., Li, G., Gruner, U., Wollnik, H., Rapid Commun. Mass Spectrom. 2 (1988) 83) have described the use of reflectrons in combination with pulsed ion extraction, and achieved mass resolutions as high as 20,000 for small ions produced by electron impact ionization.

An alternative to reflectrons is the passage of ions through an electrostatic energy filter, similar to that used in double-focusing sector instruments. This approach was first described by Poschenroeder (Poschenroeder, W., Int. J. Mass Spectrom. Ion Phys. 6 (1971) 413). Sakurai et al. (Sakuri, T.; Fujita, Y; Matsuo, T.; Matsuda, H; Katakuse, I., Int. J. Mass Spectrom. Ion Processes 66 (1985) 283) have developed a rime-of-flight instrument employing four electrostatic energy analyzers (ESA) in the time-of-flight path. At Michigan State, an instrument known as the ETOF was described that utilizes a standard ESA in the TOF analyzer (Michigan ETOF).

Lebeyec et al. (Della-Negra, S.; Lebeyec, Y., in Ion Formation from Organic Solids IFOS III, ed. by A. Benninghoven, pp 42–45, Springer-Verlag, Berlin (1986)) have described a technique known as correlated reflex spectra, which can provide information on the fragment ion arising from a selected molecular ion. In this technique, the neutral species arising from fragmentation in the flight tube are recorded by a detector behind the reflectron at the same flight time as their parent masses. Reflected ions are registered only when a neutral species is recorded within a preselected time window. Thus, the resultant spectra provide fragment ion (structural) information for a particular molecular ion. This technique has also been utilized by Standing (Standing, K. G.; Beavis, R.; Bollbach, G.; Ens, W.; Lafortune, F.; Main, D.; Schueler, B.; Tang, X.; Westmore, J. B., Anal. Instrumen. 16 (1987) 173).

A dual-reflectron time-of-flight mass spectrometer has been previously described in Cotter et al. U.S. Pat. No. 5,202,563 and Cornish, T. J., and Cotter, R. J., Time-of-flight Mass Spectrometry, R. J. ed., American Chemical Society, Washington, D.C., 1994. In Cotter et al., the instrument described comprises an ion source wherein ions are generated and then accelerated towards a first reflectron. An electrostatic field generated by the energized reflectron reflects ions towards a second reflectron. Similarly, the second reflectron reflects ions toward an ion detector. Cotter et al. demonstrates that in one particular instance the mass resolving power of the time-of-flight mass spectrometer using two reflectrons is approximately double the resolving power of a time-of-flight mass spectrometer using only a single reflectron. Notably, however, the spectrometer described in Cotter et al. is limited to two reflections as only two reflectrons are used and these are positioned so that ions follow a Z shaped trajectory through the instrument. Also notable is the fact that neither of the reflectrons can be pulsed on or off in a microsecond time frame or less.

On the other hand, it has been suggested in Wollnik, H., *Time-of-flight Mass Analyzers*, Mass Spec. Rev., 1993, 12, p.109, that two reflectrons may be configured coaxially with respect to one another in such a way that ions can be reflected back and forth repeatedly between each other. (See also UK Patent Application No. 8120809, and German Patent No. 3025764, both to Hermann Wollnik). In a hypothetical instrument, Wollnik suggests that two reflectrons be placed coaxially with respect to one another, that an ion source be placed at one end of the instrument, and that a detector be placed at the other end. Ions would exit the ion source fully accelerated and pass through the first reflectron (reflectron 1) immediately adjacent to the source—which, at that moment, would be at ground potential.

After the ions have passed through reflectron 1, reflectron 1 is rapidly energized to a high potential. In contrast, the second reflectron (reflectron 2), the reflectron adjacent to the detector, is energized before and start of the analysis. While both reflectrons are energized, ions are repeatedly reflected back and forth between them. To conclude the analysis, reflectron 2 is rapidly deenergized to ground potential so that ions are then able to pass through it into the detector. However, Wollnik does not teach how a reflectron or similar device might be pulsed on or off.

The purpose of the present invention is to provide a means and method for operating a time-of-flight mass spectrometer so as to provide significantly improved mass resolution in comparison to the time-of-flight mass spectrometers of the prior art. This invention discloses a method and apparatus for a coaxial multiple reflection time-of-flight mass spectrometer. The improved resolution is accomplished by reflecting ions repeatedly between an "accelerator" and a reflectron, one or both of which is equipped with a resistor-capacitor (RC) network that makes their rapid energizing and deenergizing possible.

Several references are related to the technology disclosed herein. For example, F. Hillenkamp, M. Karas, R. C. Beavis, B. T. Chait, Anal. Chem. 63(24), 1193A(1991); Wei Hang, Pengyuan Yag, Xiaoru Wang, Chenglong Yang, Yongxuan Su, and Benli Huang, Rapid Comm. Mass Spectrom. 8, 590(1994); A. N. Verentchikov, W. Ens, K. G. Standing, Anal.Chem. 66, 126(1994); J. H. J. Dawson, M. Guilhaus, Rapid Comm. Mass Spectrom. 3, 155(1989); M. Guilhaus, J. Am. Soc. Mass Spectrom. 5, 588(1994); E. Axelsson, L. Holmlid, Int. J. Mass Spectrom. Ion Process. 59, 231(1984); O. A. Mirgorodskaya, et al., Anal. Chem. 66, 99(1994); S. M. Michael, B. M. Chien, D. M. Lubman, Anal. Chem. 65, 2614(1993); W. C. Wiley, I. H. McLaren, Rev. Sci. Inst. 26(12), 1150(1955).

Additionally, Mamyrin et al. U.S. Pat. No. 4,072,862 discloses a time-of-flight mass spectrometer whose analyzer chamber accommodates a pulsed ion source, an ion detector and an ion reflecting system, all disposed on one and the same ion optical axis. The ion detector and the ion reflecting system described in Mamyrin et al. are disposed on opposite sides of the ion source which comprises electrodes which are transparent to the ions being studied. However, the ion source of Mamyrin et al. is not designed in such a way as to be useful as a reflectron or reflecting device. On the other hand, the present invention describes an "ion accelerator" which is the equivalent of the ion source of Mamyrin et al.

However, this ion accelerator is significantly longer along the axis of the analyzer, which leads to a significantly more uniform accelerating field and less distortion in the ion's flight time and trajectory. Furthermore, Mamyrin et al. do not teach nor suggest any method of ion analysis via multiple passes through reflecting devices.

In articles by Wollnik et al., it is suggested that ion analysis be performed by multiple reflection. Wollnik et al., *Time-of-Flight Mass Analyzers*, Mass Spec. Rev., 1993, Vol. 12, p.89; and Wollnik et al., *Spectral Analysis Based on Bipolar Time-Domain Sampling: A Multiplex Method for Time-of-Flight Mass Spectrometry*, Anal. Chem., 1992, 64, p.1601. However, the articles fail to teach how this might be accomplished. Particularly, in *Time-of-Flight Mass Analyzers*, it is not taught how a reflectron may be "switched off" quickly enough to be of any value in such a time-of-flight mass spectrometry analysis. The present invention, however, has solved this problem by using an RC network to control the energizing and deenergizing of the ion accelerator and reflectron.

Also, while Wollnik et al. do show a coaxial arrangement in FIG. 15 of *Time-of-Flight Mass Analyzers*, ion mirror 1 is not used for the initial ion acceleration. Rather, ions exiting the source have already been accelerated to the kinetic energy at which mass analysis is to occur. In contrast, the present invention has the ions enter the ion accelerator, a device equivalent to mirror 1, with a low kinetic energy (e.g. 10 eV) and are accelerated by the ion accelerator to a high energy (e.g. 10,000 eV), the energy at which mass analysis takes place. Thus, the ion accelerator of the present invention acts to initiate the mass analysis as well as to later serve as a reflection device (ion mirror).

Furthermore, in the case depicted in the Wollnik et al. reference above, both reflection devices must be pulsed. This is because Wollnik assumes the ion source is "behind" mirror 1 and that ions are accelerated to their analysis energy in the source and not by mirror 1. In the preferred embodiment of the present invention neither of these assumptions is true. Ions are introduced into the ion accelerator from the side (hence the term orthogonal time-of-flight mass spectrometry) while the ion accelerator is deenergized.

Consequently, a detector can be placed behind the ion accelerator instead of behind the ion source. In this arrangement, to accelerate ions to their analysis energy, the ion accelerator is pulsed on. Then, to detect ions, the ion accelerator is deenergized or switched off so that ions can pass through it and into the above mentioned detector. Thus, in contrast to the time-of-flight mass spectrometer depicted in Wollnik, the present invention's retleceron, which is an equivalent of Wollnik's ion mirror 2, can be constantly energized.

Finally, Cotter et al. U.S. Pat. No. 5,202,563 is notable but does not have any significant bearing on the present invention. While Cotter et al. employ multiple passes, the arrangement disclosed is not coaxial, and neither their reflectrons nor their ion source is pulsed.

SUMMARY OF THE INVENTION

The present invention relates generally to time-of-flight mass spectrometers. More specifically, this invention comprises an improved method and apparatus for analyzing ions using a time-of-flight mass spectrometer. In the present invention, two or more electrostatic reflectors are positioned coaxially with respect to one another such that ions generated by an ion source can be reflected back and forth between them. The first reflecting device is an ion accelerator whose function is two-fold. First, it acts as an accelerating device and provides the initial acceleration to the ions received from the ion source. Second, it acts as a reflecting device and reflects the ions in the subsequent mass analysis. The second reflecting device is a reflectron which acts only to reflect ions in such a manner that all ions of a given mass-to-charge ratio have substantially the same flight time through the analyzer. During the ion analysis, the ions are reflected back and forth between the accelerator and reflectron multiple times. Then, at the end of the ion analysis, either of the reflecting devices, preferably the ion accelerator, is rapidly deenergized to allow the ions to pass through that reflecting device and into a detector.

By reflecting the analyte ions back and forth between the accelerator and the reflectron several times, a much longer flight path can be achieved in a given size spectrometer than could otherwise be achieved using the time-of-flight mass spectrometers disclosed in the prior art. Consequently, the mass resolving power of the time-of-flight mass spectrometer of the present invention is substantially greater than that of the prior art.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to the preferred embodiment set forth in the illustrations of the accompanying drawing. Although the illustrated embodiment is merely exemplary of systems for carrying out the present invention, both the organization and method of operation of the invention, in general, together with further objectives and advantages thereof, may be more easily understood by reference to the drawings and the following description. The drawing is not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENT

The present invention relates generally to the mass spectroscopic analysis of chemical samples and more particularly to time-of-flight mass spectrometry. More specifically, a means and method are described for the analysis of ionized species in a spectrometer containing two or more reflecting devices such that ions can be reflected back and forth between these devices, thereby extending the flight time of the ions without extending the length of the flight tube.

Figure 1:
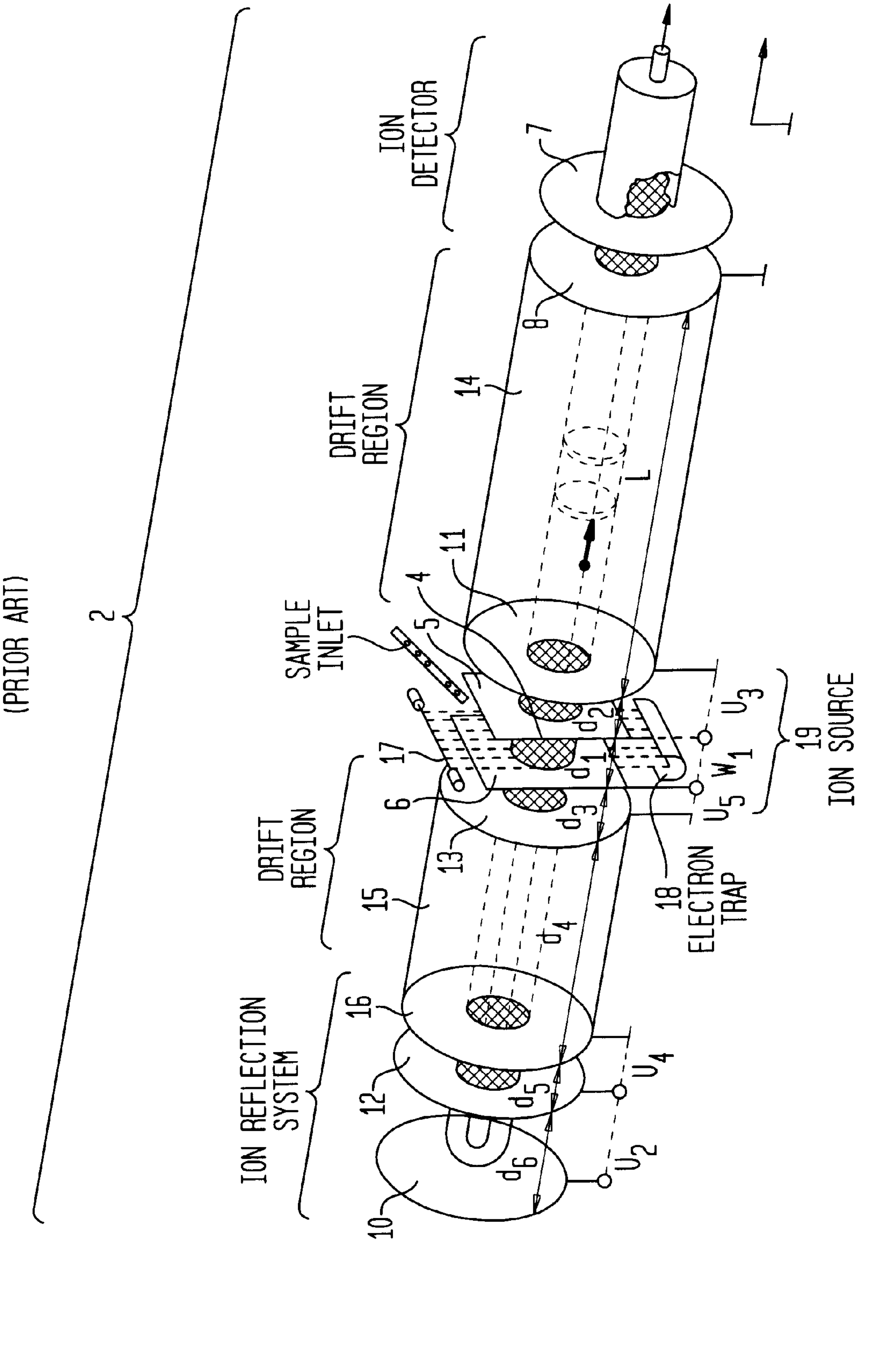
FIG. 1 (PRIOR ART)
FIG. 1 shows a prior art time-of-flight mass spectrometer according to Mamyrin et al. U.S. Pat. No. 4,072,862.

Shown in FIG. 1 is a prior art time-of-flight mass spectrometer according to Mamyrin et al. Parts of the spectrometer according to the present invention resemble this arrangement superficially. However, as will be demonstrated below, the present invention has some significant differences with regard to both means and method. Notice that, in Mamyrin et al., ions are generated in ion source 19 which is integrated into mass analyzer 2. The ions generated are accelerated out of ion source 19 along the axis of mass analyzer 2 via electric potentials on two or three metal planar electrodes 5, 6, 11 and 13. The ions are then reflected by an ion reflection system or reflectron (comprising electrodes 10, 12 and 16) back towards ion source 19. According to Mamyrin et al., by the time the ions arrive back at ion source 19, the two or three metal planar electrodes 5, 6, 11 and 13 are deenergized so that the ions can pass through ion source 19 and into detector 7.

Figure 2:
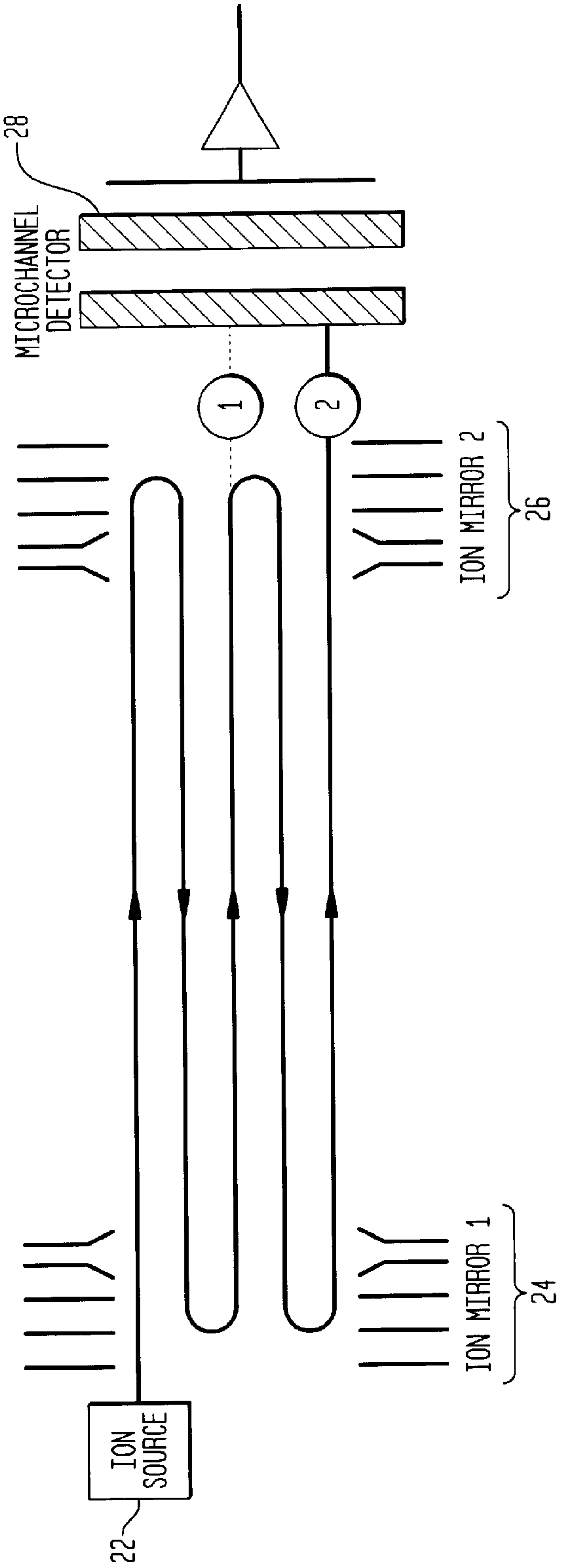
FIG. 2 (PRIOR ART)
FIG. 2 shows a prior art time-of-flight mass spectrometer according to Wollnik, H., *Time-of-Flight Mass Analyzers*, Mass Spec. Rev. 12, 89–114, 109(1993).

Next, shown in FIG. 2 is a prior art time-of-flight mass spectrometer according to H. Wollnik. Parts of the spectrometer according to the present invention also resemble this arrangement superficially. However, as will be demonstrated below, the present invention has some significant differences with regard to both means and method of time-of-flight mass spectrometry. According to Wollnik, ion source 22 produces pulses of such kinetic energy that no additional acceleration is required before mass analysis. Ion packets exiting ion source 22 pass through ion mirror 1 (24)—which at that time is at ground potential—and are eventually reflected by mirror 2 (26). Before the ions are able to return to mirror 1 (24), mirror 1 (24) is energized so that said ions are reflected back again towards mirror 2 (26). The ions may continue to be reflected between the mirrors indefinitely. To complete the analysis according to Wollnik, ion mirror 2 (26) must be rapidly "switched off" or deenergized so that ions may reach detector 28.

Figure 3:
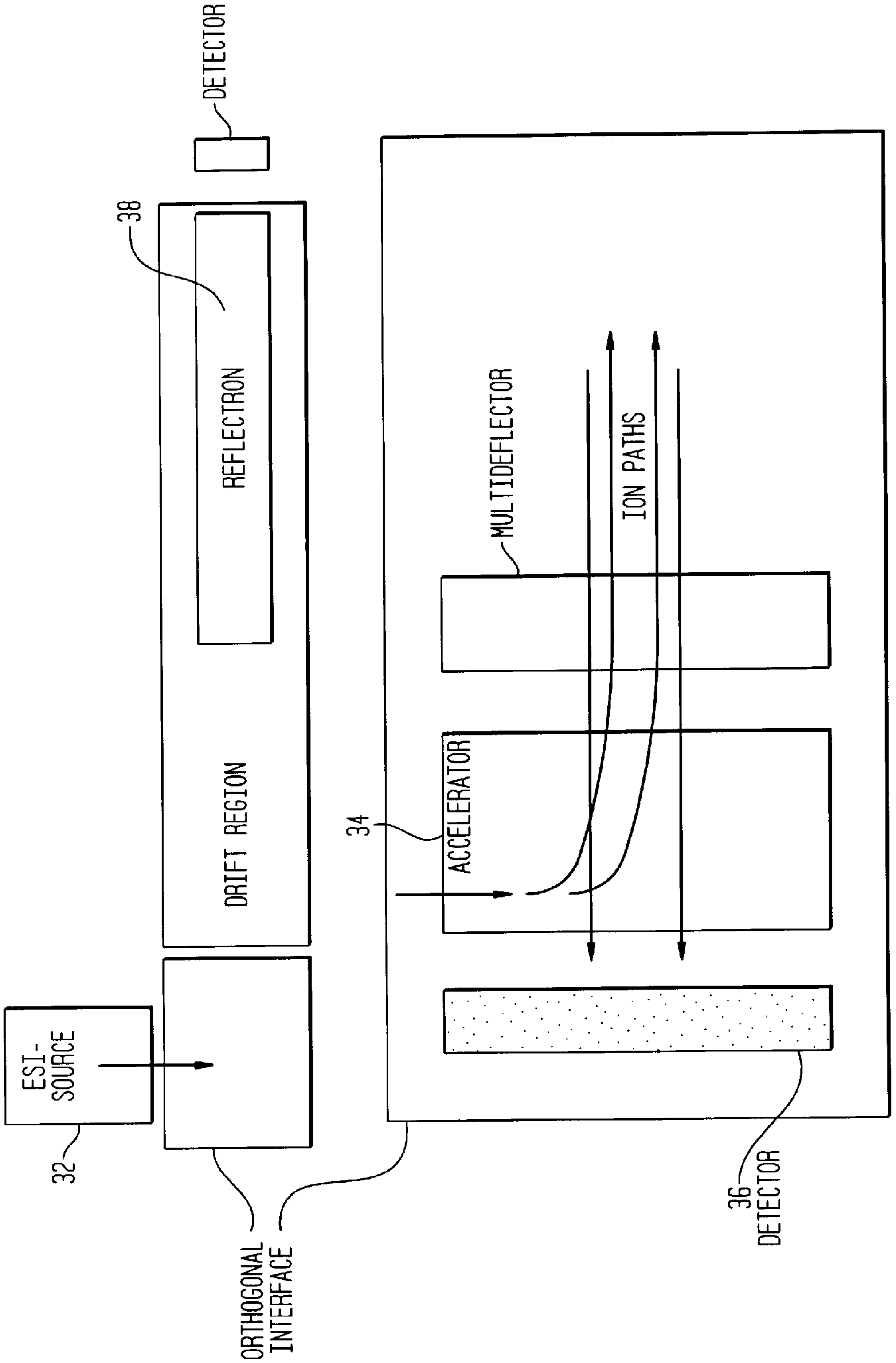
FIG. 3 is a block diagram of a preferred embodiment of the time-of-flight mass spectrometer according to the present invention.
Figure 4:
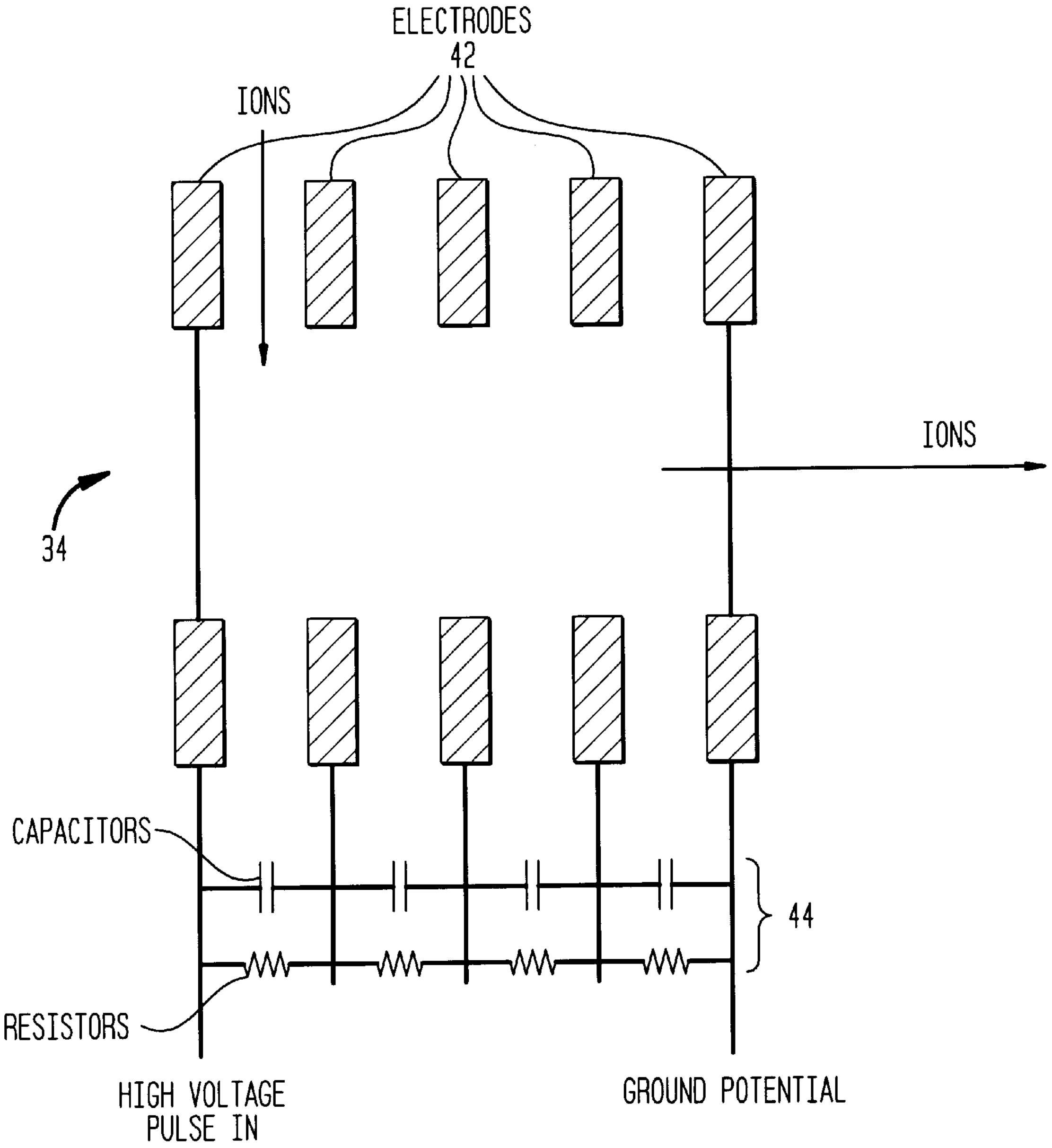
FIG. 4 shows a preferred embodiment of the ion accelerator as it is configured with the multideflector and detector according to the present invention.

FIG. 3 shows a block diagram representing a prefered embodiment according to the present invention. In contrast to the prior art spectrometer of Mamyrin et al. (FIG. 1), ion source 32 is not integrated into the mass analyzer in the preferred embodiment of the present invention. Rather, in the present invention, ions are injected from ion source 32 into ion accelerator 34 in a direction orthogonal to that in which ion analysis is to occur. Also, ion accelerator 34 according to the present invention is substantially different from Mamyrin et al.'s accelerating electrodes as can be seen in FIG. 4. As FIG. 4 shows, the preferred embodiment of ion accelerator 34 contains five accelerating electrodes 42. These electrodes 42 are electrically connected by RC network 44. It is via RC network 44 that the potentials on electrodes 42 are controlled. The electrodes 42 are conducting rings spaced at regular intervals along the axis of accelerator 34. Conducting mesh is mounted across the aperture of the two outermost rings. Capacitors are bought commercially at values of, for example, 56 pF, good for voltages up to 3 kV. The capacitance of the capacitors used should be as close to one another as reasonably possible—e.g. +/−0.2 pF. An example of a resistor value which might be used is 5 megohm, with 1% tolerance. In the example depicted, a high voltage pulse is applied to one end of the network while the other end is held at ground potential. In alternate embodiments, additional high voltage pulses might be applied to other junctions in the RC network. Further, the lead designated to be at ground potential might just as easily be held at some other potential.

Figure 5:
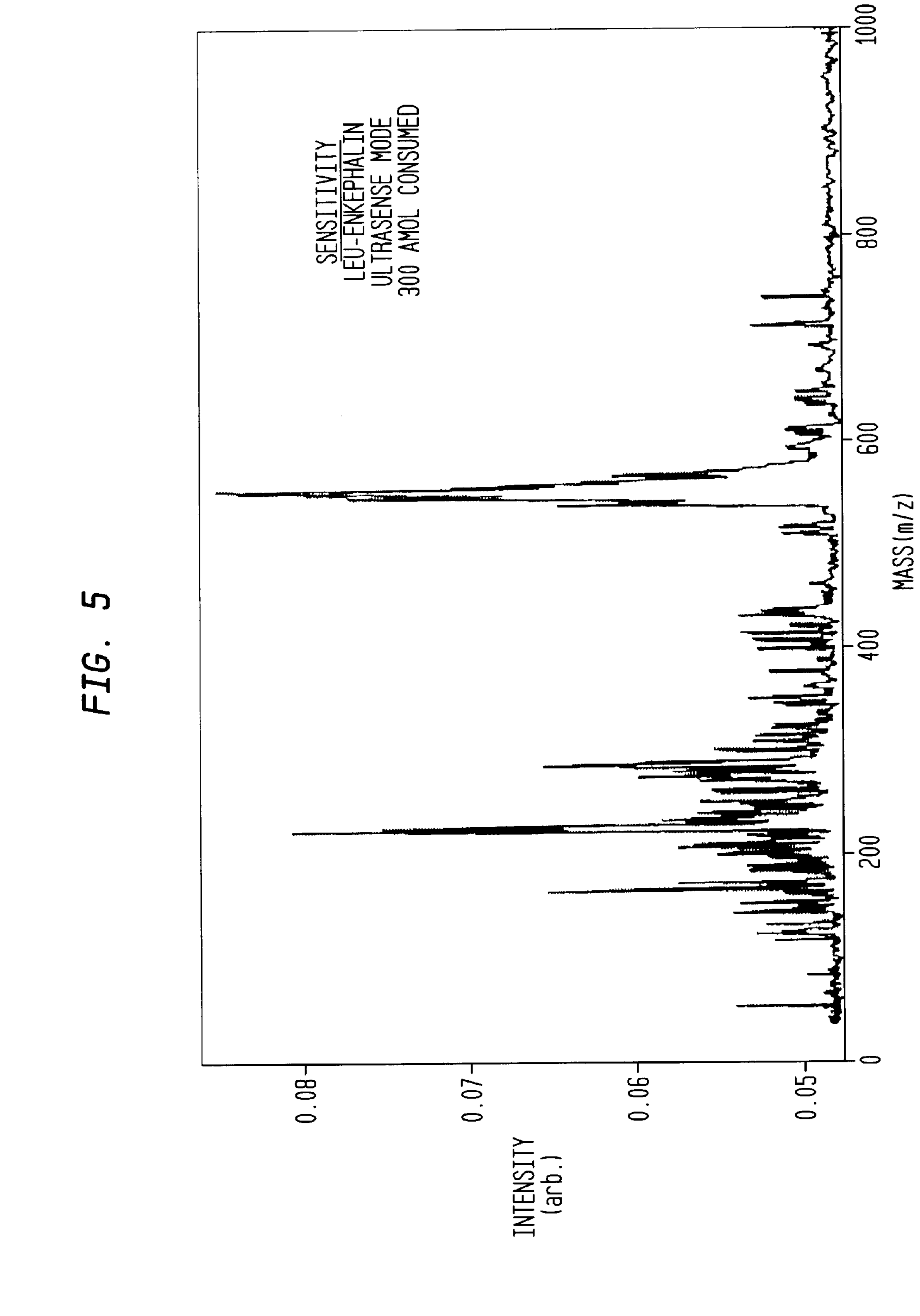
FIG. 5 shows a spectrum obtained via the survey method of operation of a preferred embodiment of a time-of-flight mass spectrometer according to the present invention.

Furthermore, the method of using the spectrometer according to the present invention differs substantially from that of Mamyrin et al. In one method according to the present invention the initial acceleration of the ions is towards a detector 36 adjacent to ion accelerator 34. This provides the user with a rapid survey over a wide ion mass-to-charge (m/z) range of what quantity and m/z ions are being produced by ion source 32. Such a survey spectrum is shown in FIG. 5.

In a second method according to the present invention the initial acceleration and reflection of the ions occurs in a manner similar to that described by Mamyrin et al. However, in contrast to Mamyrin et al.'s method, ion accelerator 34 is maintained in an energized state until and some time after the ions have returned from reflectron 38. In this way ions may be reflected by accelerator 34 back towards reflectron 38. The ions can then be reflected back and forth between ion accelerator 34 and reflectron 38 indefinitely. To complete the analysis, ion accelerator 34 is deenergized so that ions may pass through it and into ion detector 36. An example of this method of operation is illustrated in FIGS. 6 and 7.

Figure 6:
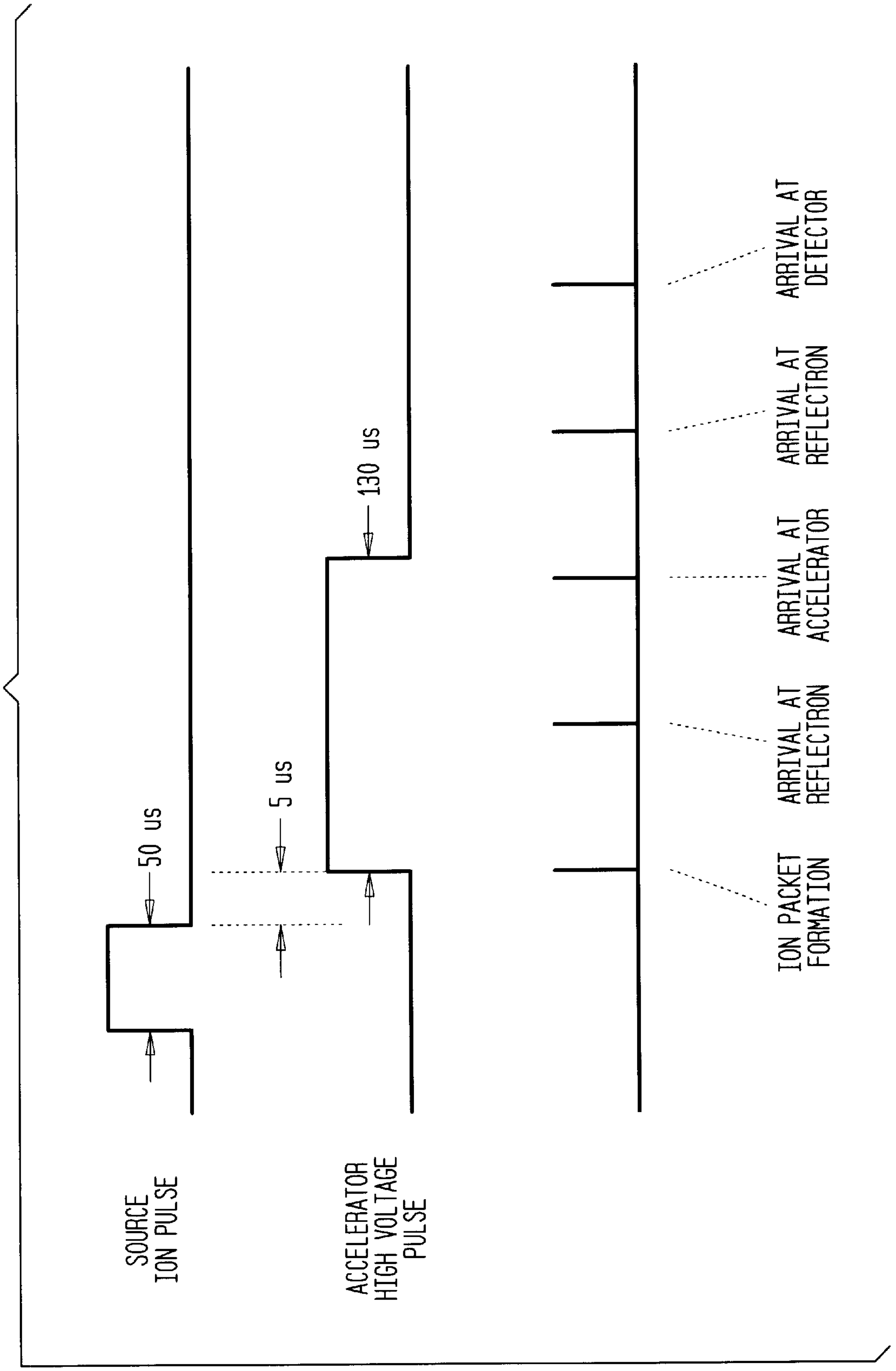
FIG. 6 shows a timing diagram showing the sequence of events which would possibly occur in an example ion analysis using the present invention.
Figure 7:
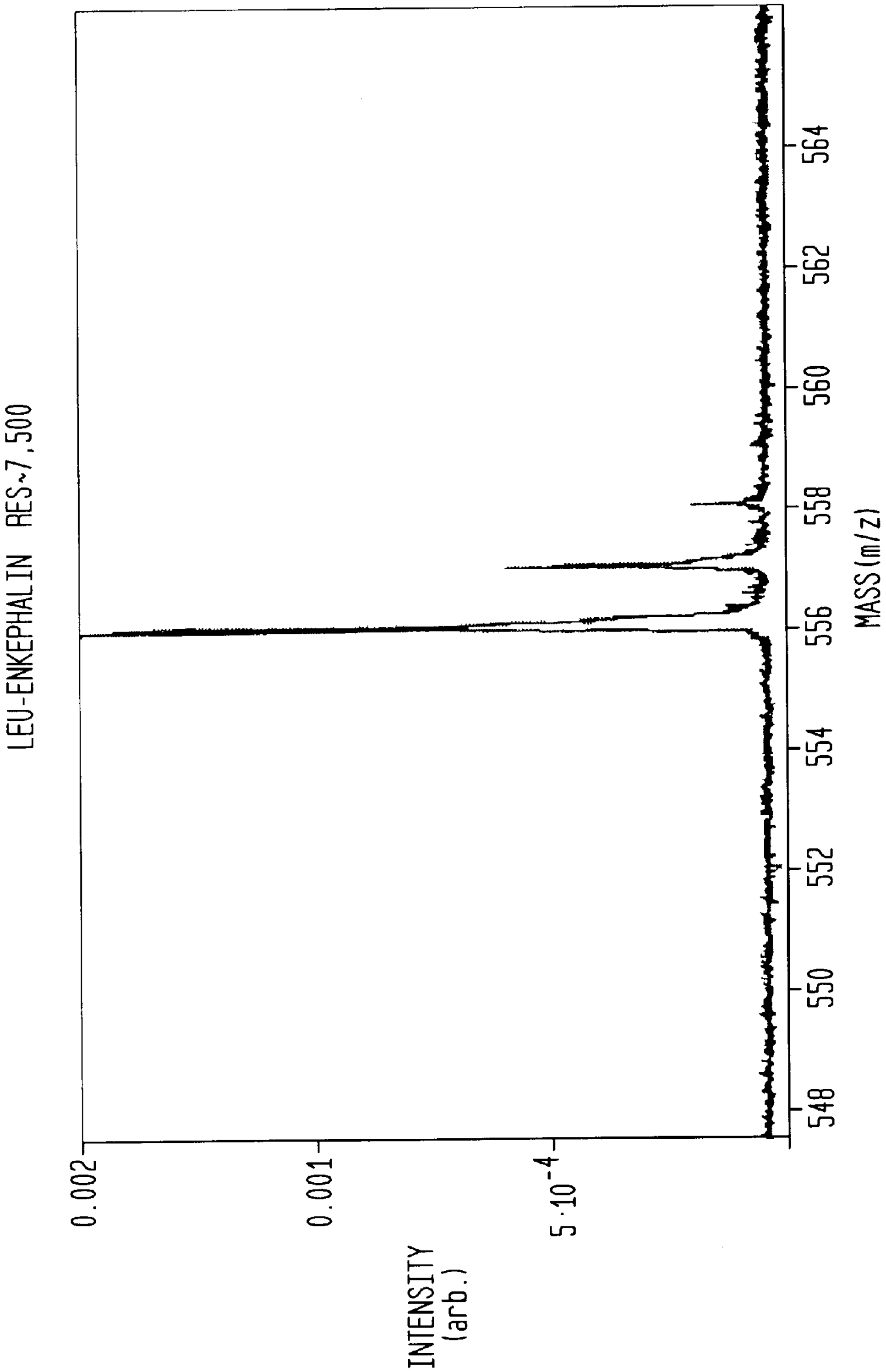
FIG. 7 shows a time-of-flight mass spectrum produced by a time-of-flight mass spectrometer according to the present invention and in accordance with the timing diagram of FIG. 6.

As detailed in FIG. 6, ion source 32 produces a pulse of ions which is in this case 50 microseconds (us) long. As depicted in FIG. 4, these ions are injected into ion accelerator 34 in a direction orthogonal to the mass analyzer. After an appropriate delay, electrodes 42 of ion accelerator 34 are energized by applying a high voltage pulse on the input of RC network 44. In this example, a 3 kV square pulse with a rise time of about 50 nanoseconds (ns) was used. The electric field produced by energized electrodes 42 accelerate the ions along the axis of the analyzer towards reflectron 38.

After reflection by reflectron 38, the ions return to ion accelerator 34 in about 120 us and are reflected back towards reflectron 38. The accelerator 34 was deenergized at 130 us with a 50 ns falltime to ground potential. After a second reflection at reflectron 38, ions returned to and passed freely through accelerator 34 and into ion detector 36. Signals from detector 36 were recorded in the form of a spectrum. The resultant mass spectrum is shown in FIG. 7.

It is useful at this point to note also the differences between the Wollnik prior art instrument of FIG. 2 and the present invention. In particular, the Wollnik prior art uses an ion source which produces ions in a pulsed manner and with a distribution of high kinetic energies. In Wollnik's prior art, the performance of the instrument is directly influenced by the duration of the ion pulses produced by Wollnik's source. That is the pulse of ions ultimately observed at the detector cannot be shorter in duration than the duration of the ion pulse produced at the source. As the mass resolving power of the instrument is inversely proportional to the ion pulse duration at the detector, it is clear that the duration of the ion pulse produced at the source is of critical importance in the performance of the instrument as a whole.

Because the present invention uses an accelerator, this invention does not require and does not use an ion source which generates high kinetic energy ions in a pulsed manner. Rather the present invention employs an ion source that produces low kinetic energy ions, all of which are of substantially the same kinetic energy. Further, the ions can be injected into the accelerator in either a pulsed, continuous, or semi-continuous manner. In contrast to Wollnik's prior art, the performance of the present invention in terms of mass resolving power is in no way influenced by the width of the ion pulse produced by the ion source. Rather, the analysis of the ions is initiated when the accelerator is pulsed on. That is, the pulsing of the accelerator forms the ions into a well defined ion pulse. By pulsing the accelerator on in about 50 ns, the ions can be formed into a pulse which is on the order of 2 ns in duration regardless of the duration of the ion pulse provided by the source.

Also, Wollnik's prior art uses two reflectrons, both of which must be pulsed according to the prior art method. In addition, Wolinik does not teach how the reflectrons might be energized and deenergized in a pulsed manner rapidly enough to be of value as is done in the present invention. For example, in the present invention, the flight time of an ion from the accelerator to the reflectron and back may be as little as 50 us. This represents the maximum time which may be allowed to turn on or off a reflectron. In conventional operation, a useful turn-on or turn-off time for the reflectrons would be on the order of 1 us.

In contrast, the present invention teaches the use of an RC network to energize and deenergize the electrodes of an accelerator and/or reflectron in a pulsed manner with turn-on and turn-off times of about 0.05 us. Also, the present invention teaches the use of an accelerator and a reflectron instead of two reflectrons. Further, the present invention teaches a means and method whereby only the accelerator need be pulsed. Finally, an alternative embodiment of the present invention is described below and is such that the analysis is concluded using a deflecting device which deflects the ions away from the analyzer axis and into a detector.

Figure 8:
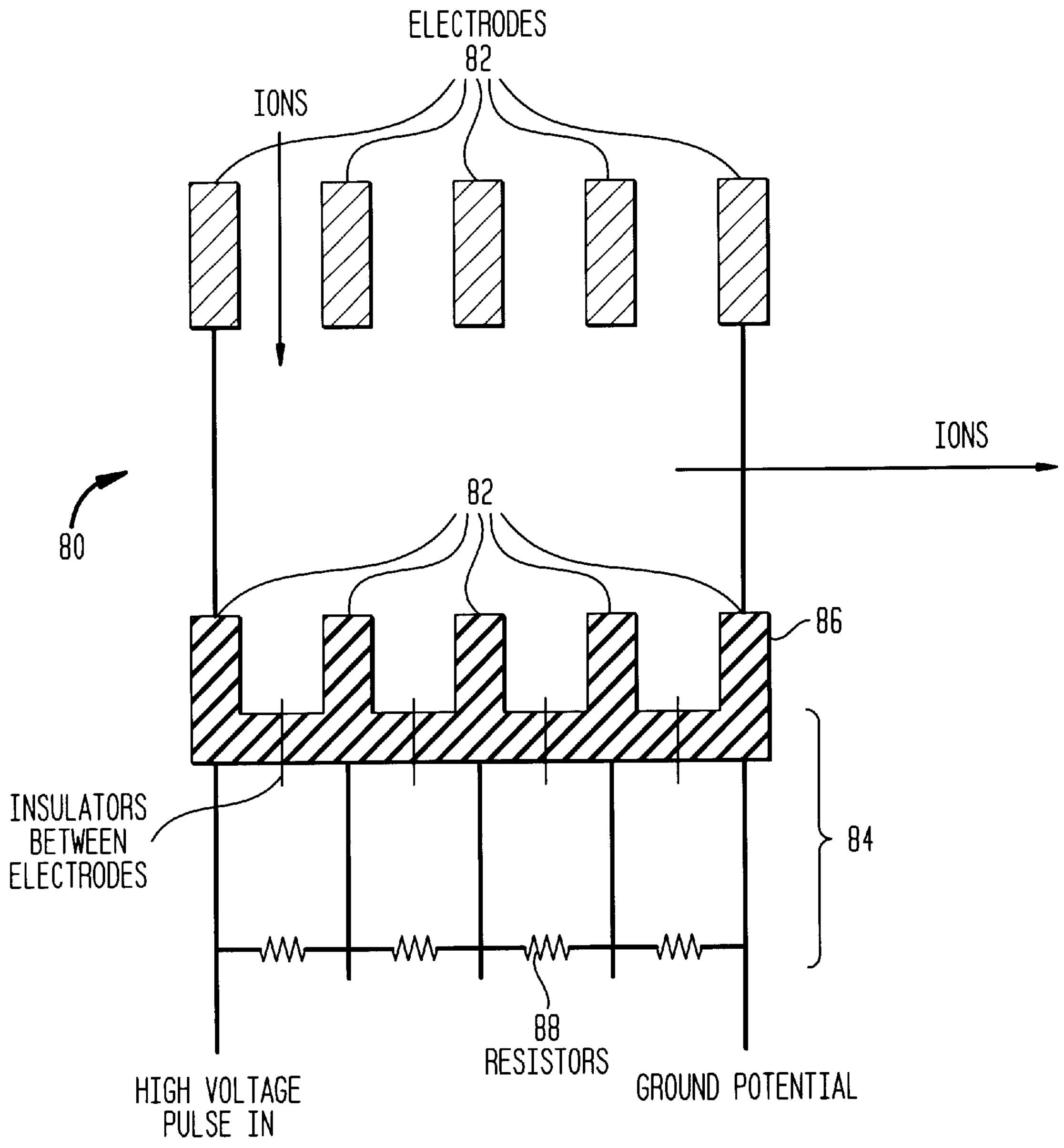
FIG. 8 shows an alternative embodiment of the accelerator according to the present invention wherein the capacitors of the RC network are formed from the electrodes of the accelerator.

FIG. 8 shows an alternative embodiment of an accelerator 80 according to the present invention. In this embodiment, capacitors 86 of RC network 84 are formed from electrodes 82 of accelerator 80. As shown, capacitors 86 may be produced by forming the electrodes with a rim at least part of the way around electrodes 82. By bringing the rims of adjacent plates sufficiently close together, the capacitance between them can, in principle, be made to be any desired value. Insulating material may be placed between the electrodes to insure that arcs do not occur when RC network 84 is energized.

Figure 9:
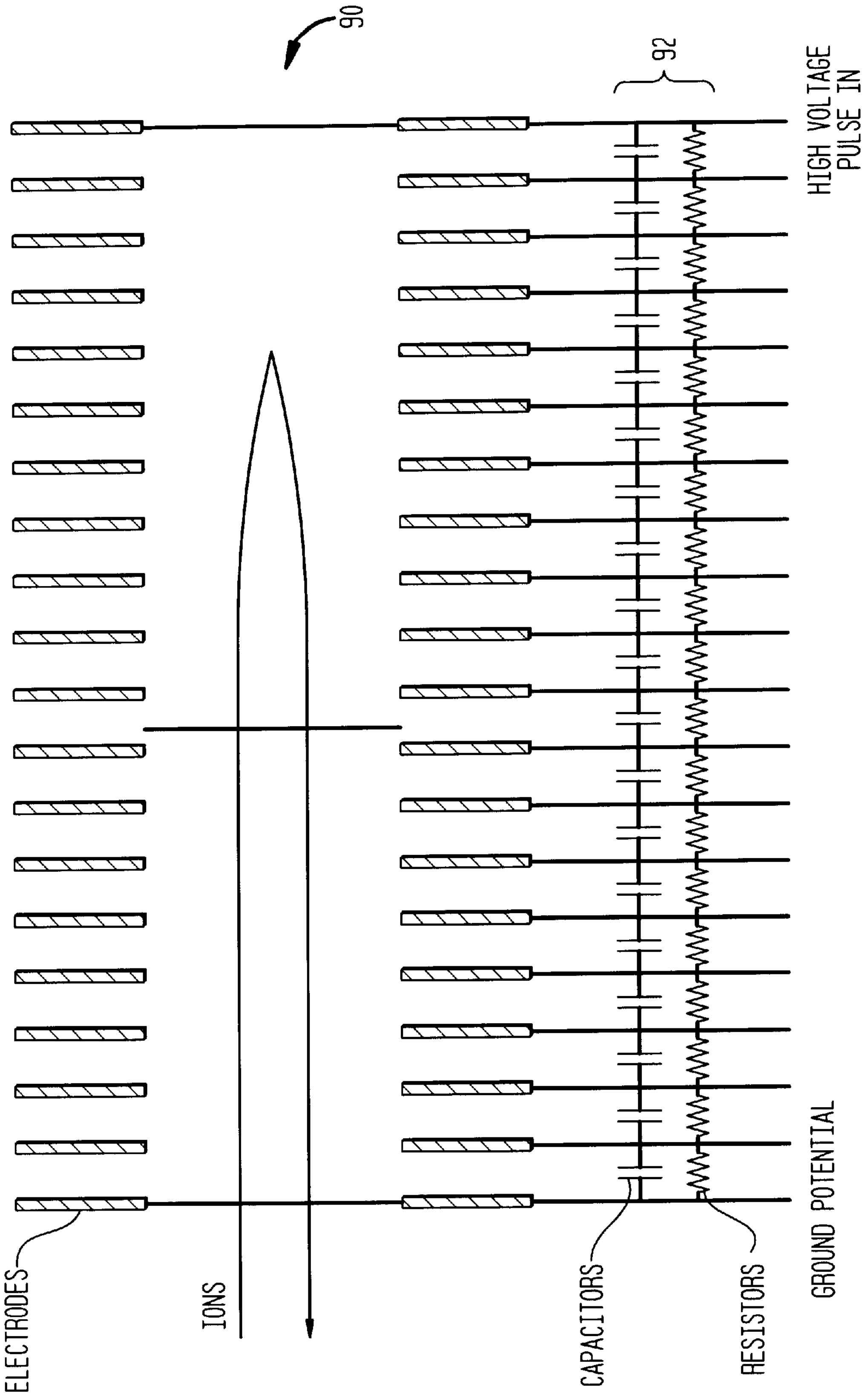
FIG. 9 shows a preferred embodiment of the reflectron according to the present invention.

FIG. 9 shows an embodiment of a reflectron 90 according to the present invention. This embodiment shows how an RC network 92 may be used to electrically connect the elements of a reflectron 90 to one another. As in the accelerator, the electrodes of reflectron 90 are formed as conducting rings which are equally spaced along the axis of reflectron 90. Also, conducting mesh is mounted on the two outer electrodes. Equipping a reflectron 90 with an RC network 92 makes it possible to pulse the reflectron "on" and "off" in a short time scale—i.e. less than 1 us.

However, in the preferred embodiment of the spectrometer of the present invention, the reflectron is not pulsed. As a result, the capacitors are not required. In this case only resistors are used in biasing the reflectron's electrodes. It should be noted that in any of the above cases where an RC network is used, one may form an electrical input at any junction. That is, instead of providing a high voltage pulse at one end of the network and ground at the other end, one could provide an additional pulse in the middle of the network at one of the junctions between two capacitors. This would allow one to form two homogeneous electrostatic fields within a reflectron, for example, via the two sections of the RC network.

Figure 10:
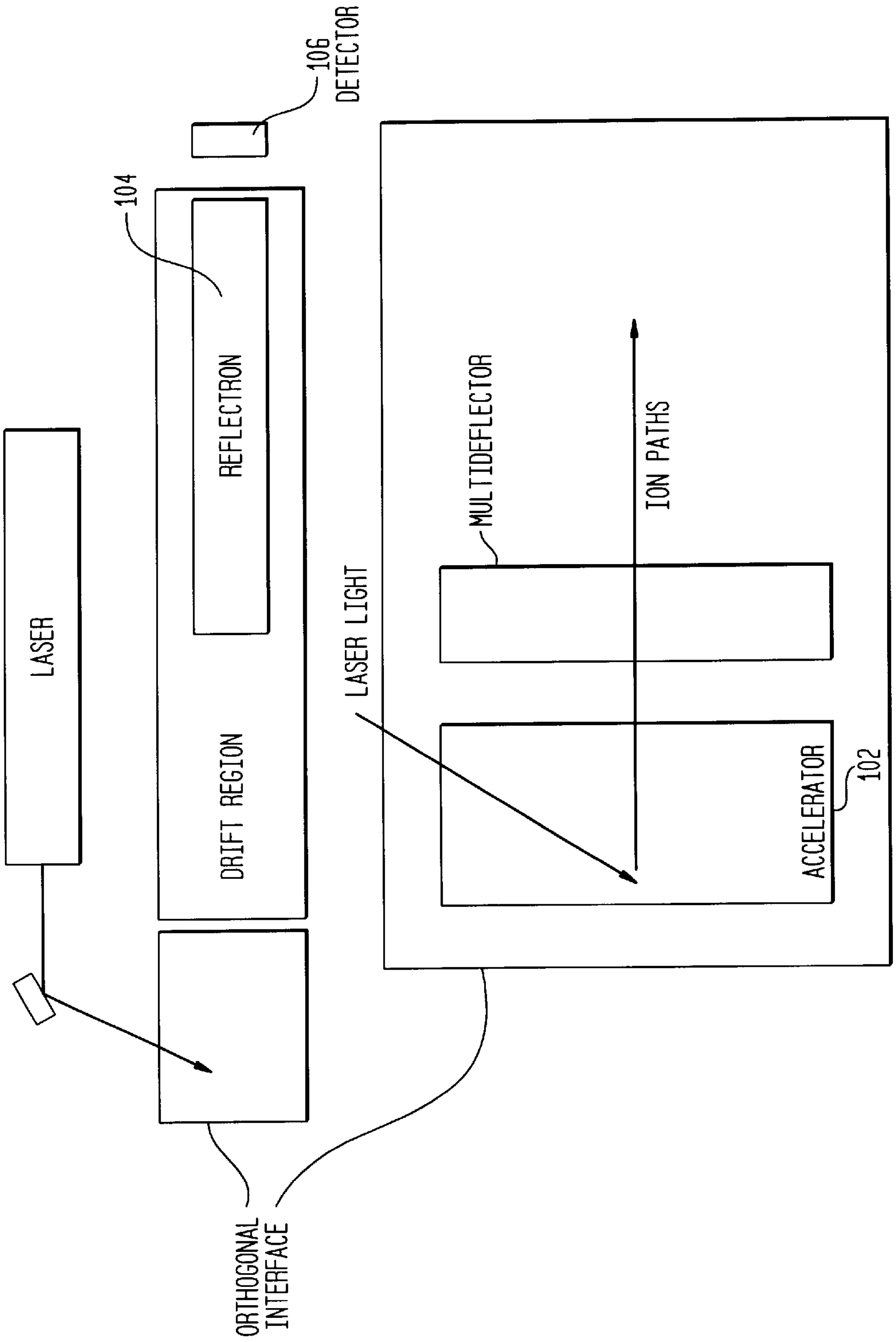
FIG. 10 shows an alternative embodiment of the time-of-flight mass spectrometer according to the present invention wherein the accelerator is not pulsed and the reflectron is pulsed on and off to allow for the detection of ions by a detector adjacent to the reflectron.

Referring now to FIG. 10, shown is an alternative embodiment of the time-of-flight mass spectrometer according to the present invention wherein the accelerator is no, pulsed but the reflectron is pulsed to allow for the analysis and detection of ions. In this embodiment, accelerator 102 is always energized. A pulse of ions is produced within accelerator 102 by, for example, laser ionization. These ions are immediately accelerated by accelerator 102 along the axis of the analyzer toward reflectron 104. At the beginning of the analysis, reflectron 104 is energized. Thus, ions reaching reflectron 104 are reflected back toward accelerator 102. Now, the ions are reflected back and forth between accelerator 102 and reflectron 104 an indefinite number of times until the analysis is concluded by pulsing off or deenergizing reflectron 104. At such time, the ions are then able to pass freely through reflectron 104 and into detector 106 adjacent to it.

Figure 11:
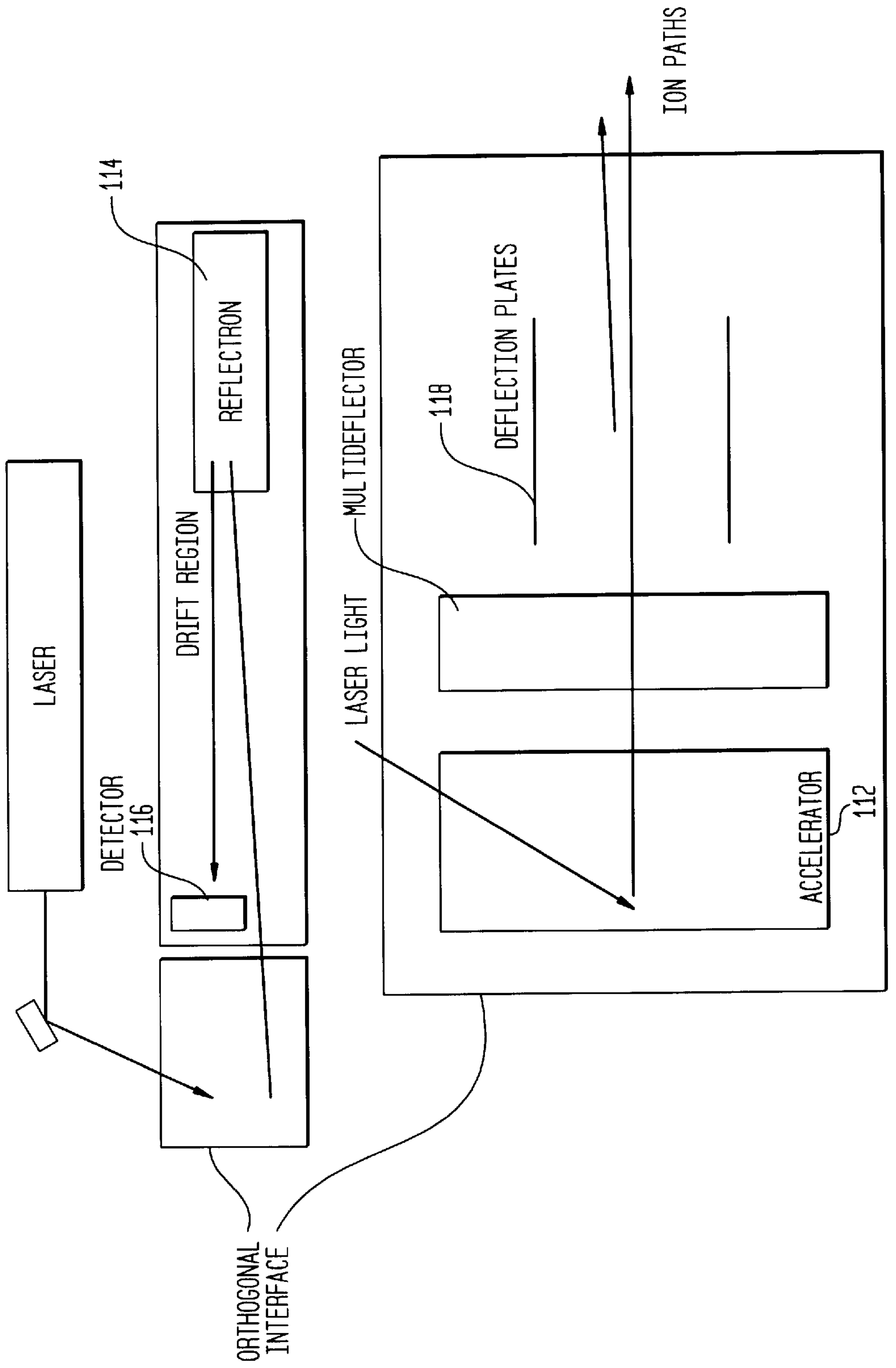
FIG. 11 shows an alternative embodiment of the spectrometer according to the present invention wherein neither the accelerator nor the reflectron are pulsed, and wherein ions are deflected at the end of the analysis by a deflecting device onto a trajectory which ends at a detector.

FIG. 11 shows yet another alternative embodiment of the spectrometer according to the present invention wherein accelerator 112 or reflectron 114 are not necessarily pulsed. In this case, ions may be generated external to accelerator 112, if the accelerator is pulsed on or energized, or interior to accelerator 112, in which case the accelerator is always energized. In either case, reflectron 114 is continuously energized so that ions will be reflected back and forth between accelerator 112 and reflectron 114 multiple times. To conclude the analysis, the ions are deflected by deflecting device 118 onto a trajectory which ends at detector 116. The deflecting device 118 may, for example, be a pair of conventional deflection plates as shown or a multideflector.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

What is claimed is:

1. An apparatus for a time-of-flight mass spectrometer, said apparatus comprising:

means for producing ions from a sample;

an ion drift region;

means for accelerating ions into said drift region, said accelerating means comprising a plurality of electrodes;

means for reflecting said ions comprising a plurality of electrodes;

means for detecting said ions; and means for controlling application of potentials to said electrodes to energize and deenergize said accelerating and reflecting means;

wherein said accelerating means is capable of reflecting said ions back into said drift region; and wherein said means for reflecting is positioned coaxial with said means for accelerating.

2. An apparatus according to claim 1, wherein the means for producing ions from a sample is a pulsed generator, a laser particle beam, a pulsed particle beam, or a pulsed electron beam.

3. An apparatus according to claim 1, further comprising means for external control of the potential applied to the electrodes.

4. An apparatus according to claim 1, further comprising means for independent external control of potentials applied to said electrodes.

5. An apparatus according to claim 1, further comprising means for the external control of the timing of the potentials applied to the electrodes.

6. An apparatus according to claim 1, wherein said means for producing ions from a sample is an ion source external to said analyzer.

7. An apparatus according to claim 1, further comprising at least one pulse generator.

8. An apparatus according to claim 7, wherein said pulse generator is a high voltage pulse generator.

9. An apparatus according to claim 1, wherein said detector is positioned behind either said means for accelerating or said means for reflecting.

10. An apparatus according to claim 1, wherein said ion detector is positioned on the axis of said mass spectrometer adjacent to at least one of said means for accelerating or said means for reflecting.

11. An apparatus according to claim 1, wherein said ion producing means is an electrospray ionization source.

12. An apparatus according to claim 1, wherein said ion producing means is a chemical ionization source.

13. An apparatus according to claim 1, wherein said ion producing means is a matrix assisted laser desorption ionization source.

14. An apparatus according to claim 1, wherein said ion producing means is an electron ionization source.

15. An apparatus according to claim 1, wherein said ion producing means is an atmospheric pressure ionization source.

16. An apparatus according to claim 1, wherein said electrodes comprise planar conducting mesh.

17. An apparatus according to claim 1, wherein said electrodes comprise planar, conducting, apertured plates.

18. An apparatus according to claim 1, wherein said electrodes comprise planar, conducting plates having slits.

19. An apparatus according to claim 1, wherein said means for reflecting comprises at least two conducting electrodes arranged parallel and adjacent to one another along the axis of said means for reflecting.

20. An apparatus according to claim 19, wherein at least one of said electrodes of said means for reflecting comprise planar, conducting mesh.

21. An apparatus according to claim 19, wherein at least one of said electrodes of said means for reflecting comprise apertured, conducting, planar plates.

22. An apparatus according to claim 19, wherein at least one of said electrodes of said means for reflecting comprise planar, conducting plates having slits.

23. An apparatus according to claim 1, wherein an ion guide is used to guide ions from said ion producing means into said means for accelerating, wherein said ion guide comprises conducting electrodes having static and/or oscillating electric potentials applied thereto.

24. An apparatus according to claim 1, said apparatus further comprising at least one ion trap comprising conducting electrodes having static and/or oscillating electric potentials applied thereto, wherein said ion trap accepts said ions from said ion producing means, traps said ions within said ion trap, and ejects said ions in a pulsed manner into said means for accelerating.

25. An apparatus according to claim 1, wherein said ions are introduced into said means for accelerating in a direction orthogonal to the axis of said means for accelerating.

26. An apparatus according to claim 1, wherein said ion producing means is an electrospray ionization source.

27. An apparatus according to claim 1, wherein said ion producing means is a chemical ionization source.

28. An apparatus according to claim 1, wherein said ion producing means is a matrix assisted laser desorption ionization source.

29. An apparatus according to claim 1, wherein said ion producing means is an electron ionization source.

30. An apparatus according to claim 1, wherein said ion producing means is an atmospheric pressure ionization source.

31. An apparatus according to claim 1, wherein at least one of said electrodes comprise planar conducting mesh.

32. An apparatus according to claim 1, wherein at least one of said electrodes comprise planar, conducting, apertured plates.

33. An apparatus according to claim 1, wherein at least one of said electrodes comprise planar, conducting plates having slits.

34. An apparatus according to claim 1, wherein said ion producing means is an integral part of said mass spectrometer.

35. An apparatus according to claim 1, wherein said means for accelerating ions comprises at least two conducting electrodes arranged parallel and adjacent to one another along the axis of said means for accelerating ions.

36. An apparatus according to claim 35, wherein at least one of said electrodes of said means for accelerating ions comprise planar, conducting mesh.

37. An apparatus according to claim 35, wherein at least one of said electrodes of said means for accelerating ions comprise apertured, conducting, planar plates.

38. An apparatus according to claim 35, wherein at least one of said electrodes of said means for accelerating ions comprise planar, conducting plates having slits.

* * * * *